United States Patent
Gosebruch et al.

(10) Patent No.: US 6,573,626 B1
(45) Date of Patent: Jun. 3, 2003

(54) APPARATUS FOR UNINTERRUPTEDLY SUPPLYING POWER INCLUDING AN ELECTRICAL MACHINE AND A FLYWHEEL

(75) Inventors: Harald Gosebruch, Verden (DE); Norbert Ueffing, Osterode (DE)

(73) Assignee: Piller GmbH, Osterode (DE)

( * ) Notice: Subject to any disclaimer, the term of this patent is extended or adjusted under 35 U.S.C. 154(b) by 0 days.

(21) Appl. No.: 09/807,121
(22) PCT Filed: Oct. 8, 1999
(86) PCT No.: PCT/EP99/07577
§ 371 (c)(1), (2), (4) Date: Apr. 6, 2001
(87) PCT Pub. No.: WO01/28065
PCT Pub. Date: Apr. 19, 2001

(51) Int. Cl.⁷ .............................. H02K 17/44; H02J 9/08
(52) U.S. Cl. ..................... 310/74; 310/113; 290/30 A; 322/4; 322/40; 307/64
(58) Field of Search ........................... 370/74, 112, 113; 290/1 R, 1 A, 30 A, 30 B, 40 R; 322/4, 40; 307/64, 66, 67, 68

(56) References Cited

U.S. PATENT DOCUMENTS

| | | | | |
|---|---|---|---|---|
| 2,376,421 A | * | 5/1945 | Drake | 322/32 |
| 3,221,172 A | * | 11/1965 | Rillson | 290/30 A |
| 3,609,426 A | * | 9/1971 | Gaul | 290/4 C |
| 4,233,858 A | | 11/1980 | Rowlett | 74/675 |
| 4,278,928 A | | 7/1981 | Griffiths et al. | 322/29 |
| 4,382,188 A | * | 5/1983 | Cronin | 290/1 C |
| 4,423,794 A | | 1/1984 | Beck | 180/165 |
| 4,439,720 A | * | 3/1984 | Georges | 290/4 R |
| 4,517,471 A | | 5/1985 | Sachs | 307/67 |
| 4,525,661 A | * | 6/1985 | Mucsy et al. | 322/4 |
| 4,857,755 A | * | 8/1989 | Comstock | 307/47 |
| 5,194,757 A | * | 3/1993 | Wertheim | 307/67 |
| 5,913,932 A | * | 6/1999 | Takayama | 198/621.1 |
| 6,133,716 A | * | 10/2000 | Schutten | 290/30 A |

FOREIGN PATENT DOCUMENTS

| | | |
|---|---|---|
| DE | 30 02 945 A1 | 1/1980 |
| DE | 31 29 928 A1 | 7/1981 |
| DE | 44 42 948 A1 | 12/1994 |
| DE | 197 15 175 C1 | 4/1997 |

OTHER PUBLICATIONS

Search Report for PCT/ep99/07577, Jun. 8, 2000.

* cited by examiner

Primary Examiner—Dang Dinh Le
(74) Attorney, Agent, or Firm—Thomas, Kayden, Horstemeyer & Risley

(57) ABSTRACT

An apparatus for uninterruptedly supplying power includes an electrical machine including a rotor and being designed and arranged to be connected to a load to be supplied with alternating current. Coupling units include a differential transmission including three input/output shafts. A flywheel is designed and arranged to store kinetic energy and to be connected to the rotor by the coupling units. Control units include a controllable brake and at least one electrical auxiliary machine to be operated as a motor. The electrical auxiliary machine and the controllable brake engage the third input/output shaft. The control units keep the number of rotations of the electrical machine approximately constant when the electrical machine is operated as a generator by kinetic energy being stored in the flywheel. The control units are being designed and arranged to operate the electrical auxiliary machine as a motor to realize a desired final number of rotations of the flywheel during operation of the electrical machine as a motor.

13 Claims, 3 Drawing Sheets

APPARATUS FOR UNINTERRUPTEDLY SUPPLYING POWER INCLUDING AN ELECTRICAL MACHINE AND A FLYWHEEL

FIELD OF THE INVENTION

The present invention relates to an apparatus for uninterruptedly supplying power including an electrical machine including a rotor and being operable as a motor or as a generator, the electrical machine being connected to a load to be supplied with alternating current without a converter having a variable feed frequency being arranged in between, a flywheel being coupled to the rotor by coupling units having a variable ratio of transmission, and control units for the transmission of the coupling units, the control units at least in a certain range of the number of rotations of the flywheel keeping the number of rotations of the electrical machine being operated as a generator constant by the kinetic energy being stored in the flywheel.

BACKGROUND OF THE INVENTION

Apparatuses for uninterruptedly supplying power serve to compensate especially short-term failures of a power network. Generally and also hereinafter, they are often called UPS systems. Usually, the power network is used to supply a load with alternating current. It is a known concept to operate an electrical machine as a motor in addition to the load by means of the power network. The electrical machine affects a flywheel in a way to reach a certain number of rotations, and it keeps the flywheel at this number of rotations. In case the network fails, the kinetic energy being stored in the flywheel may be used to operate the electrical machine as a generator to supply the load with alternating current. Consequently, the kinetic energy of the flywheel and its number of rotations decrease. When the flywheel is fixedly coupled to the generator, a converter having a variable feed frequency has to be arranged between the generator and the load to feed the load with alternating current at a constant frequency. Especially in the medium voltage range of approximately 10.000 volt, such a converter, as well as a d.c./a.c. converter that would have to be arranged after a direct current machine as electrical machine, is a complex unit when it is to be designed for greater capacities, meaning for greater currents. However, even if it is designed for greater capacities, it is extremely sensitive to short circuit currents.

It is known to design an apparatus for uninterruptedly supplying power in which the flywheel is not fixedly coupled to the rotor of the electrical machine, but instead by coupling units having a variable transmission. In a concrete known apparatus for uninterruptedly supplying power by the firm HOLEC/HITEC, the coupling units include an electromagnetic clutch being arranged between the electrical machine and the flywheel. The electromagnetic clutch enables the flywheel to decelerate without the number of rotations of the electrical machine being operated as a generator decreasing. In case of a simple structure of the electromagnetic clutch, this is possible as long as the number of rotations of the flywheel is more than the desired constant number of rotations of the generator. In this case, it is necessary that the flywheel be accelerated by the electrical machine being operated as a motor via a different torque transmission path to reach a greater number of rotations than the number of rotations of the electrical machine. When the electromagnetic clutch is desired to also allow for an increasing transmission of the respective driving feed number of rotations, the design of the electromagnetic clutch and the design of the required control units is especially complicated.

It is also known from prior art UPS systems to provide a combustion engine for longer-term failures of the network to operate the electrical machine as a generator when longer-term power failures have to be compensated. The rotor of the electrical machine is connected to the generator by an overrunning clutch or a by a switchable clutch. When no converter having a variable feed frequency is arranged after the electrical machine, the number of rotations of the combustion engine must have already reached the number of rotations of the electrical machine before it may be coupled to the electrical machine. Then, the number of rotations has to be kept constant.

An electrical generator arrangement is known from U.S. Pat. No. 4,278,928. A differential transmission in the form of a planetary transmission is arranged to precede the input shaft of an electrical generator. The input shaft of the generator is connected to the sun wheel of the planetary transmission. The cage rotor of the planets of the planetary transmission is connected to the input shaft of the entire electrical generator arrangement. The gear rim of the planetary transmission may be driven at different numbers of rotations by a hydraulic drive to vary the ratio of transmission of the planetary transmission such that the number of rotations of the generator is kept constant even when the number of rotations at the input shaft of the entire electrical generator arrangement changes. The hydraulic medium for the hydraulic drive is provided by pumps that are driven by the input shaft of the generator rotating at a constant number of rotations or by a different element of the generator.

SUMMARY OF THE INVENTION

The coupling units include a differential transmission including three input/output shafts and that the control units include an electrical auxiliary machine being operable as a motor and a controllable brake, the electrical auxiliary machine and the controllable brake engaging the third input/output shaft of the differential transmission, wherein the control units are designed in a way that the auxiliary machine may also be operated as a motor to reach the desired final number of rotations of the flywheel when the electrical machine is operated as a motor.

In the novel UPS system, the flywheel is connected to the rotor of the electrical machine by a differential transmission. A differential transmission means a mechanical transmission including three input/output shafts of which at least two are not coupled to one another. The differential transmission is used as a transmission having a variable ratio of transmission by an electrical auxiliary machine being operable as a motor and a controllable brake both engaging the third input/output shaft of the differential transmission. By means of the auxiliary machine, additional kinetic energy is stored in the flywheel during operation of the electrical machine as a motor. During operation of the electrical machine as a generator, the number of rotations of the electrical machine may be kept constant by means of the controllable brake at least until the number of rotations of the third input/output shaft of the differential transmission has decreased to reach zero.

Typically, the capability of the auxiliary machine in the novel UPS system is substantially less than the capability of the electrical machine.

For example, the differential transmission of the novel UPS system may be a mechanical differential transmission or a planetary transmission.

In a preferred embodiment of the novel UPS system, the differential transmission is designed as a planetary transmission including a sun wheel, a cage rotor carrying planetary wheels and a gear rim. The sun wheel is fixedly connected to the input/output shaft leading to the flywheel and the cage rotor is fixedly connected to the input/output shaft leading to the electrical machine. The gear rim is coupled to the input/output shaft leading to the auxiliary machine at a fixed ratio of transmission. In case of this arrangement, the planetary transmission serves for a transmission of the number of rotations of the motor into a greater transmission of the number of rotations of the flywheel to store as much kinetic energy as possible in a flywheel having a given moment of inertia. This transmission is further increased with the electrical auxiliary machine by driving the gear rim in an opposite direction. During the use of the energy of the flywheel, the electrical energy that has been produced by the auxiliary machine to increase the transmission of the planetary transmission is recovered. The electrical energy is recovered except a small portion thereof that has been converted to heat.

The controllable brake may be an additional mechanical brake. However, the electrical auxiliary machine may instead be designed to be operable as an electromagnetic brake. The brake consumes the power that has been produced in the auxiliary machine or it may be used as emergency power.

In the simplest case, the electrical auxiliary machine is an asynchronous machine that is directly connected to be power network by the control units when it is operated as a motor. An asynchronous machine as auxiliary machine is to be combined with an additional controllable brake. When the number of rotations of the third input/output shaft of the differential transmission has been reduced to reach zero—while the asynchronous machine typically has been switched off—the control units may connect the asynchronous machine to the electrical machine being operated as a generator with a polarity being inverted compared to the network operational mode to accelerate the third input/output shaft of the differential transmission in an opposite sense of rotation. The exact control of the number of rotations for keeping constant and the number of rotations of the electrical machine is again achieved by means of the mechanical brake.

When the electrical auxiliary machine is a synchronous machine that is connectable to the electrical machine and to the load by a converter, the auxiliary machine may be operated as the brake or at least to provide a portion of the braking effort. The power that is produced in the auxiliary machine while braking may be fed to the load by the converter such that the electrical energy is not lost. Furthermore, the use of the synchronous machine with the converter makes it possible to theoretically use the kinetic energy of the flywheel until its number of rotations has reached zero. This means that the kinetic energy of the flywheel may be fully used. In the lower range of numbers of rotations of the flywheel, it is necessary to operate the electrical auxiliary machine as a motor at a sense of rotation being opposite compared to the one in the network operational mode. This serves to maintain the number of rotations of the rotor of the electrical machine. The electrical machine being operated as a motor by the electrical auxiliary machine provides the required energy. In this way, the electrical auxiliary machine compensates the energy balance except the power loss. Only a portion of the total power flows through the converter being located between the electrical auxiliary machine and the electrical machine and the load, respectively. Consequently, the converter has a substantially simpler design compared to one used for an electrical machine that is operated at a variable number of rotations.

The electrical auxiliary machine may also be designed as a direct current machine that is connectable to the electrical machine and to the load by a converter. In this case, the same operational modes are possible as it is the case with an asynchronous machine including a converter.

Usually, the electrical machine of the novel UPS system is a synchronous machine having a simple design at low costs although it is very powerful.

In addition to the flywheel being provided to compensate short-term power failures with its kinetic energy, the rotor may be drivable by a combustion engine to compensate long-term power failures. A clutch being switchable by the control units may be arranged between the rotor and the combustion engine.

It is especially preferred to arrange a differential transmission between the rotor and the combustion engine. The differential transmission is provided in addition or alternatively to the switchable clutch. The third input/output shaft of the differential transmission is coupled to another electrical auxiliary machine of the control units. The additional auxiliary machine serves to compensate differences concerning numbers of rotations of the rotor with respect to the combustion engine, especially when the combustion engine has not yet reached its final number of rotations. The final number of rotations of the combustion engine is either approximately identical to the number of rotations of the rotor, or it is related thereto with a fixed ratio.

In a further developed embodiment, the combustion engine does not require a starter motor since the differential transmission is arranged between the combustion engine and the rotor. The energy being necessary to start the combustion engine is then provided by the electrical machine in combination with the additional auxiliary machine and, finally, by the flywheel.

However, it is also possible to arrange an overrunning clutch between the rotor and the combustion engine. In this case, a separate starter motor for the combustion engine is required.

In the novel UPS system, the running up of the electrical machine into a range of numbers of rotations in which it is operable as a synchronous motor may be realized by means of the electrical auxiliary machine without an additional motor. The flywheel may be kept still. Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
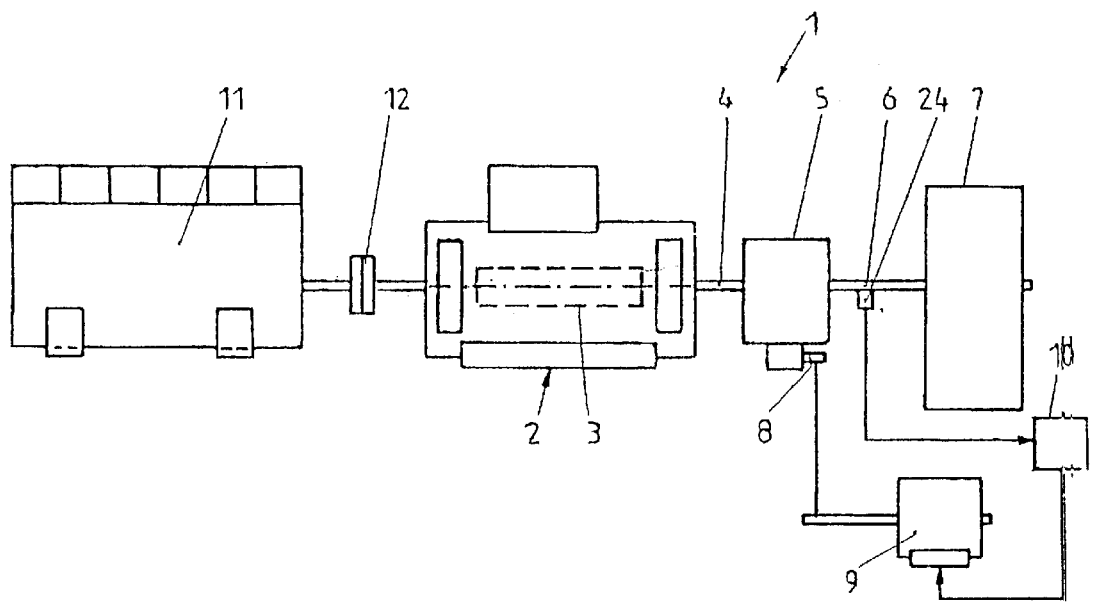
FIG. 1 shows the general arrangement of the structural components of the novel apparatus for uninterruptedly supplying power in a first embodiment.

The UPS system 1 ("UPS=Uninterruptible Power Supply") includes an electrical machine 2 in the form of a synchronous machine that may be operated as a motor or as a generator. A rotor 3 of the electrical machine 2 is fixedly connected to an input/output shaft 4 of a differential transmission 5 in this case being designed as a planetary transmission. Another input/output shaft 6 of the differential transmission 5 is fixedly connected to a flywheel 7. A third input/output shaft 8 of the differential transmission 5 is connected to the rotor of an electrical auxiliary machine 9 at a fixed ratio of transmission. The input/output shaft 6 is connected to the sun wheel, the input/output shaft 4 is connected to the cage rotor of the planetary wheels and the input/output shaft 8 is connected to the gear rim of the planetary transmission forming the differential transmission 5. In this arrangement, the auxiliary machine 9 in this case being designed as an electrical synchronous machine is controllable by a control unit 10 in a way that the number of rotations of the input/output shaft 4 is kept constant, even when the number of rotations of the flywheel 7 decreases during operation of the electrical machine 2 as a generator. The control unit 10 determines the number of rotations of the input/output shaft 6 by a sensor 24. The control unit 10 also serves to influence the flywheel 7 by a respective control of the electrical auxiliary machine 9 in a way that the number of rotations is increased with respect to the rotor 3 of the electrical machine 2 when the electrical machine 2 is operated as a motor. This is done to store as much kinetic energy as possible in the flywheel 7. The stored kinetic energy is available to overcome power failures of an electric network to which the UPS system 1 is arranged parallel. For longer lasting power failures of the external power supply, a combustion engine 11 may be coupled to the rotor 3 of the electrical machine 2 by an overrunning clutch 12. The overrunning clutch 12 allows for a greater number of rotations, but not for a lower number of rotations of the rotor 3 with respect to the combustion engine 11.

Figure 2:
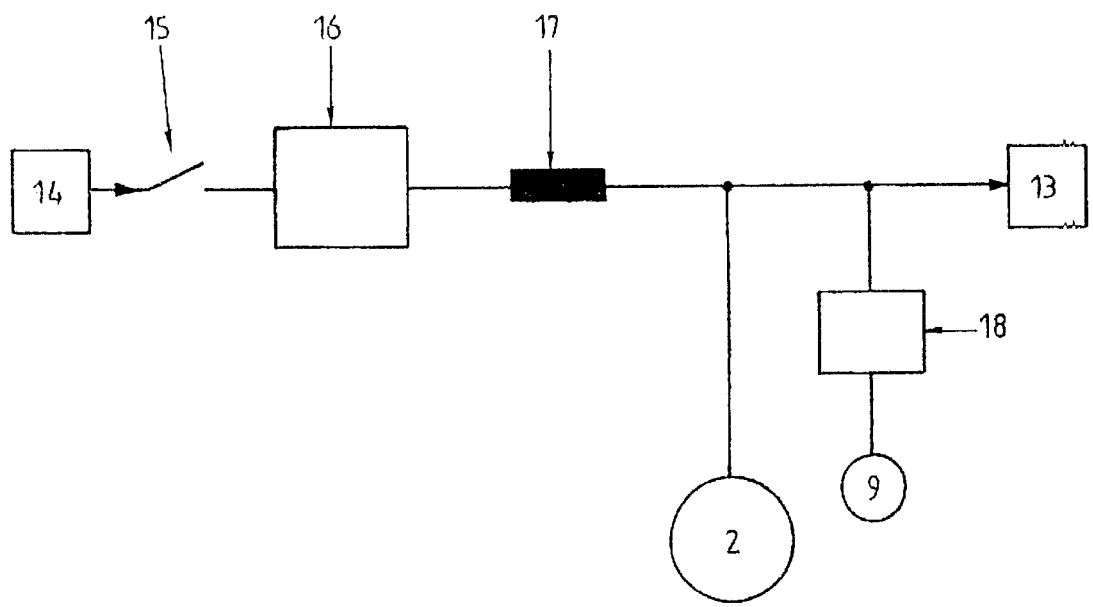
FIG. 2 shows a single line flow diagram being directed to the novel apparatus for uninterruptedly supplying power in the embodiment according to FIG. 1.

The single line flow diagram of FIG. 2 illustrates the power supply of a load 13 either by an external source of power 14 or by the electrical machine 2. Typically, the external source of power 14 is a public power network. In this case, a first switch 15, a tyristor switch 16 and a throttle 17 are arranged between the external source of power 14 and the load 13. The throttle 17 may also be connected in a known T-shaped manner. In this case, the throttle 17 also has an effect on the power coming from the electrical machine 2 to a desired extent. The electrical machine 2 is connected between the throttle 17 and the load 13. No converter or d.c./a.c. converter is connected in between. However, a converter 18 is located in front of the electrical auxiliary machine 9 and the load 13.

In the following, different operational conditions of the UPS system 1 according to FIGS. 1 and 2 will be explained based on a planetary transmission i13=−2. The following table is a survey of the operational modes:

| | Operational modes | Flywheel RPM 1/min | Flywheel Power kW | Generator RPM 1/min | Generator shaft Power kW | Auxiliary drive RPM 1/min | Auxiliary drive Power kW |
|---|---|---|---|---|---|---|---|
| 1 | Normal condition, the system is connected to the power network | 4000 | 0 | 1500 | 0 | 333 | 0 |
| 2 | Unloading the flywheel I | 4000 | −1000 | 1500 | 761 | 333 | 239 |
| 3 | Unloading the flywheel II | 3000 | −1000 | 1500 | 1000 | 0 | 0 |
| 4 | Unloading the flywheel III | 2500 | −1000 | 1500 | 1186 | −167 | −186 |
| 5 | Loading the flywheel I | 2500 | 84.3 | 1500 | −100 | −167 | 15.7 |
| 6 | Loading the flywheel II | 3000 | 100 | 1500 | −100 | 0 | 0 |
| 7 | Loading the flywheel III | 4000 | 131.4 | 1500 | −100 | 333 | −31.4 |

1. Normal Operation

The system is connected to the power network.

During normal operation of the load 13 external source of power 14, the switch 15 and the tyristor switch 16 are closed in the single line flow diagram according to FIG. 2. The load 13, as well as the electrical machine 2 being operated as a motor, is connected to the throttle 17. The power being consumed by the load 13, as well as the power loss of the electrical machine 2 and of the auxiliary machine 9, is completely taken from the external source of power 14. A constant number of rotations is introduced into the gear rim of the planetary transmission by the auxiliary machine 9 to provide a constant ratio of transmission of the input/output shafts 4 and 6 of the planetary transmission.

2. Unloading the Flywheel I

When the external source of power 14 fails, the energy that has been stored in the flywheel 7 during normal operation according to 1 is recovered. In this case, the switch 15 and the tyristor switch 16 are opened. In the example being illustrated in the above table, it is assumed that the load 13 has a demand for power of 1.000 kW. First, the power is partially provided by the electrical machine 2 and by the electrical auxiliary machine 9. Due to the branching concerning power and moments in the planetary transmission, the electrical auxiliary machine 9 is driven by the flywheel 7 to operate as a generator. The number of rotations of the electrical auxiliary machine 9 continuously decreases in cooperation with the number of rotations of the flywheel 7.

3. Unloading the Flywheel II

Since the number of rotations of the electrical machine 2 being operated as a generator is kept constant by the electrical auxiliary machine 9, an inversion of its sense of rotation and of the flow of power at the auxiliary machine 9 result when the number of rotations of the electrical auxiliary machine 9 has reached zero.

4. Unloading the Flywheel III

Consequently, the auxiliary machine 9 has to be operated as a motor when the number of rotations of the flywheel 7 further decreases. The necessary energy is derived from the electrical machine 2 being operated as a generator. Thus, the electrical machine 2 has to produce both the power of the load and of the electrical auxiliary machine 9. However, this does not mean that additional power is taken from the flywheel 7 since the power of the electrical auxiliary machine 9 is again available to the electrical machine 2 at the side of its entrance.

5. Loading the Flywheel I

When the flywheel 7 is reloaded by the electrical machine 2 being operated as a motor, the sense of rotation of the electrical auxiliary machine 9 is continuously inverted with respect to its prior sense of rotations during the operation of the electrical machine 2 as a generator. First, electrical energy is produced during the deceleration of the auxiliary machine 9, the electrical energy being provided to the load 13 and to the electrical machine 2 being operated as a motor, respectively, via the converter 18.

6. Loading the Flywheel II

After the number of rotations of the electrical auxiliary machine 9 has reached the value of zero, again, the inversion of power and the inversion of the sense of rotation of the electrical auxiliary machine 9 occur.

7. Loading the Flywheel III

Then, the final number of rotations of the flywheel 7 is reached by the electrical machine 2, as well as the electrical machine 9 being operated as motors. After the final number of rotations of the flywheel 7 has been reached, only friction losses and similar power losses have to be compensated by the two electrical machines 2 and 9.

Figure 3:
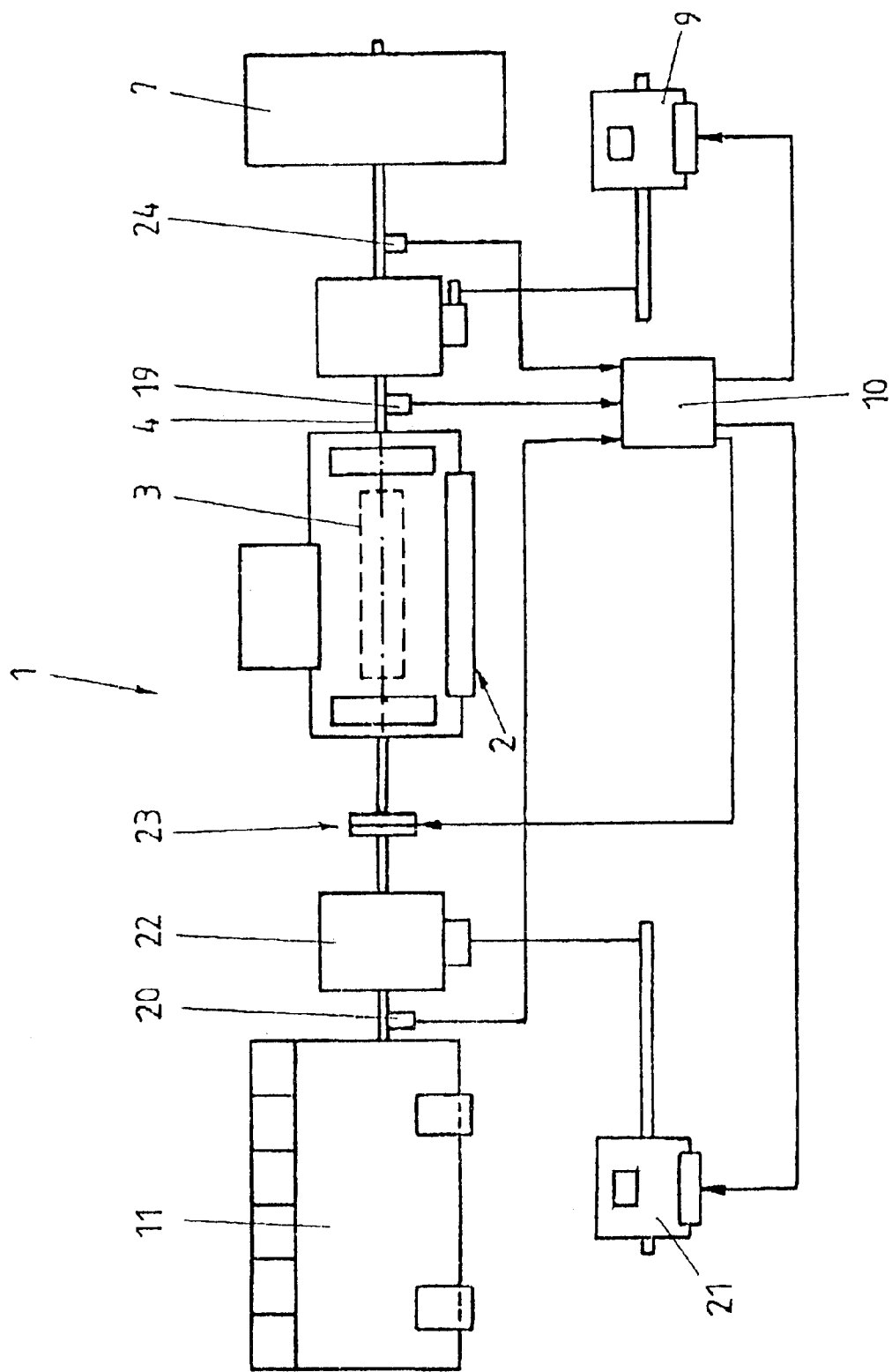
FIG. 3 shows the general arrangement of the structural components of a second embodiment of the novel apparatus for uninterruptedly supplying power.

The embodiment of the UPS system 1 according to FIG. 3 differs from the one according to FIG. 1 in two aspects. First, the control unit 10 has a more complex design, and it additionally derives the number of rotations of the input/output shaft 4 by an additional sensor 19. Another sensor 20 is located at the output shaft of the combustion engine 11, and it supplies the control unit 10 with the number of rotations of the combustion engine 11. This arrangement is used by the control unit 10 to also adjust the ratio of transmission of a further differential transmission 22 by a further electrical auxiliary machine 21. In this case, the differential transmission 22 is also designed as a planetary transmission. The additional differential transmission 22 is located between a switchable clutch 23 and the combustion engine 11. The rotor 3 of the electrical machine 2 is arranged at the other side of the switchable clutch 23 being operated by the control unit 10. It is possible to even out differences concerning the numbers of rotations of the combustion engine 11 and of the rotor 3 of the electrical machine 2. One reacts to very great differences concerning numbers of rotations, as they for example occur during the standstill of the combustion engine 11, by disengaging the clutch 23. For this purpose, the clutch 23 could also be designed as an overrunning clutch. It is even imaginable not to arrange the clutch 23 at all. However, in this case, the additional electrical auxiliary machine 21 has to reach a comparatively great number of rotations during the standstill of the combustion engine 11, and the differential transmission 22 is permanently run which leads to friction losses. When the planetary transmission 22 and the electrical auxiliary machine 21 are used, it is not necessary to arrange a separate starter motor for the combustion engine 11. However, this arrangement results in certain requirements for the control unit 10 to guarantee synchronism of the rotor 3 of the electrical machine 2 at a constant number of rotations. In this case, it is not possible to use an overrunning clutch 12.

Figure 4:
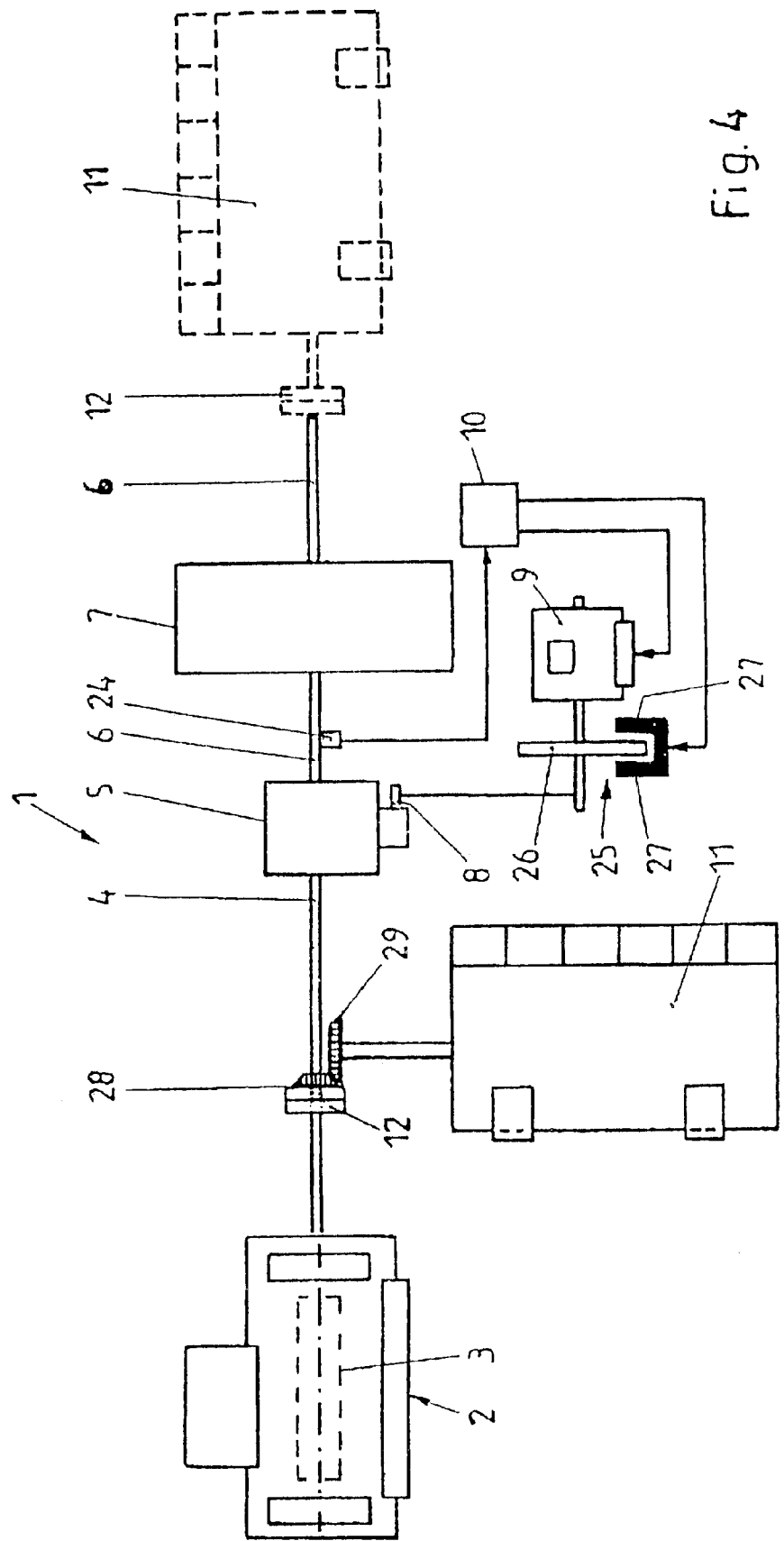
FIG. 4 shows the general arrangement of the structural components of a third embodiment of the novel apparatus for uninterruptedly supplying power.

Compared to the embodiment according to FIG. 3, the embodiment of the UPS system 1 according to FIG. 4 differs from the embodiment according to FIG. 1 with respect to different aspects. According to FIG. 4, the auxiliary machine 9 is designed as an electrical asynchronous machine that is also operated as a motor by simply connecting it to the power network when the electrical machine 2 is operated as a motor during the network operational mode. During operation of the electrical machine 2 as a generator, the auxiliary machine 9 of the embodiment according to FIG. 4 is simply switched off. The control of the third input/output shaft 8 of the differential transmission 5 is then realized by a separate mechanical brake 25. In this case, the mechanical brake 25 includes a brake disc 26 being arranged on the shaft of the auxiliary machine 9 and brake shoes 27 engaging the brake disc 26. The brake force of the brake 25 is controlled by the control unit 10 in a way that the number of rotations of the input/output shaft 4 is kept constant until the number of rotations of the input/output shaft 8 has been reduced to zero by braking. In case kinetic energy is also to be taken from the flywheel 7 in the following, meaning when the number of rotations further decreases, the auxiliary machine 9 may be connected to the electrical machine 2 being operated as a generator with a polarity being inverted compared to the network operational mode to now drive the input/output shaft 8 in the opposite sense of rotation. The mechanical brake 25 again achieves the exact control of the number of rotations of the auxiliary machine 9 for keeping constant the number of rotations of the electrical machine 2. Contrary to the embodiments according to FIGS. 1 and 3, in the embodiment according to FIG. 4, kinetic energy is consciously consumed by the mechanical brake 25, meaning it is converted to heat. Consequently, no power electronic for feeding back the power that has been produced by the auxiliary machine 9 is required. Furthermore, when an asynchronous machine is used as the auxiliary machine 9, it is not necessary to use a converter for its operation as a motor. The embodiment of the UPS system 1 according to FIG. 4 is generally characterized by an especially low expenditure for the control unit 10. Additionally, the embodiment is based on the use of an electrical machine 2 of a common type at low costs, meaning one that does not include a continuous input/output shaft 4. The combustion engine 11 may be coupled to the input/output shaft 4 by the overrunning clutch 12 and the gear wheels 28 and 29, as an example of a simple mechanical branching transmission. Due to the ratio of teeth of the gear wheels 28 and 29 and the ratio of transmissions of the branching transmission, respectively, different nominal numbers of rotations of the combustion engine 11 and of the electrical machine 2 may be taken into account. FIG. 4 additionally illustrates in dashed lines a further alternative possibility of arranging the combustion engine 11 when an electrical machine 2 of a standard design is used. However, when the combustion engine 11 is coupled to the input/output shaft 6, there is the disadvantage of the combustion engine 11 only affecting the electrical machine 2 via the inert flywheel 7 when the combustion engine 11 is desired to drive the electrical machine 2 as a generator. Consequently, the starting action of the combustion engine 11 to reach the range of number of rotations of its nominal power is delayed.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. An apparatus for uninterruptedly supplying power, comprising:

an electrical machine including a rotor and being designed and arranged to be operated as a motor and as a generator and to be connected to a load to be supplied with alternating current without a converter having a variable feed frequency being arranged between said electrical machine and the load;

coupling units having a variable ratio of transmission and including a differential transmission, said differential transmission including a first input/output shaft, a second input/output shaft and a third input/output shaft;

a flywheel being designed and arranged to store kinetic energy and to be connected to said rotor by said coupling units; and control units being designed and arranged for the transmission of said coupling units and including a controllable brake and an electrical auxiliary machine being designed and arranged to be operated as a motor, said electrical auxiliary machine and said controllable brake being designed and arranged to engage said third input/output shaft of said differential transmission, said control units being designed and arranged to keep the number of rotations of said electrical machine constant at least in a certain range of the number of rotations of said flywheel when said electrical machine is operated as a generator by kinetic energy being stored in said flywheel, and said control units being designed and arranged in a way that said electrical auxiliary machine is operated as a motor to reach a desired final number of rotations of said flywheel when said electrical auxiliary machine is operated as a motor and that said electric auxiliary machine is continuously operated as a motor at full speed to maintain the desired final number of rotations of said flywheel as long as said electric auxiliary machine is operated as a motor.

2. The apparatus of claim 1, wherein said electrical auxiliary machine is designed and arranged to be operated as said controllable brake.

3. The apparatus of claim 1, wherein said electrical auxiliary machine is designed and arranged to be operated as said controllable brake.

4. The apparatus of claim 1, wherein said electrical auxiliary machine is an asynchronous machine.

5. The apparatus of claim 1, further comprising a converter being designed and arranged to connect said electrical auxiliary machine to said electrical machine and to the load, and wherein said electrical auxiliary machine is a synchronous machine.

6. The apparatus of claim 1, further comprising a combustion engine being designed and arranged to drive said rotor.

7. The apparatus of claim 6, further comprising a clutch being arranged between said rotor and said combustion engine and being designed and arranged to be switched by said control units.

8. The apparatus of claim 7, further comprising a second differential transmission and a second electrical auxiliary machine, said second differential transmission being arranged between said rotor and said combustion engine and said third input/output shaft of said first differential transmission being coupled to said second electrical auxiliary machine.

9. The apparatus of claim 8, wherein said combustion engine does not include a separate starter motor.

10. The apparatus of claim 6, further comprising an overrunning clutch being arranged between said rotor and said combustion engine.

11. The apparatus of claim 10, further comprising a second differential transmission and a second electrical auxiliary machine, said second differential transmission being arranged between said rotor and said combustion engine and said third input/output shaft of said first differential transmission being coupled to said second electrical auxiliary machine.

12. The apparatus of claim 6, further comprising a second differential transmission and a second electrical auxiliary machine, said second differential transmission being arranged between said rotor and said combustion engine and said third input/output shaft of said first differential transmission being coupled to said second electrical auxiliary machine.

13. The apparatus of claim 12, wherein said combustion engine does not include a separate starter motor.

* * * * *